(12) United States Patent
Sunabashiri

(10) Patent No.: US 6,206,411 B1
(45) Date of Patent: Mar. 27, 2001

(54) APPARATUS FOR PROTECTING CREW MEMBER OF AUTOMOBILE WHEN COLLISION OF SIDE PORTION THEREOF OCCURS

(75) Inventor: Yukisada Sunabashiri, Tokyo (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/308,318

(22) PCT Filed: Sep. 18, 1998

(86) PCT No.: PCT/JP98/04232

§ 371 Date: May 19, 1999

§ 102(e) Date: May 19, 1999

(87) PCT Pub. No.: WO99/15374

PCT Pub. Date: Apr. 1, 1999

(30) Foreign Application Priority Data

Sep. 19, 1997 (JP) ........................................ 9-255604

(51) Int. Cl.$^7$ .......................... B60R 21/22; B60R 21/16
(52) U.S. Cl. ..................................... 280/730.2; 280/728.2
(58) Field of Search ............................... 280/728.2, 730.2

(56) References Cited

U.S. PATENT DOCUMENTS

| 5,586,782 | 12/1996 | Zimmerman, II et al. | 280/730.2 |
| 5,803,485 | * 6/1999 | Acker et al. | 280/728.2 |
| 5,913,536 | * 6/1999 | Brown | 280/728.2 |

FOREIGN PATENT DOCUMENTS

| 9-136600 | 5/1997 | (JP) . |
| 3038479 | 6/1997 | (JP) . |
| 9-202203 | 8/1997 | (JP) . |
| 10-100764 | 4/1998 | (JP) . |

* cited by examiner

*Primary Examiner*—Brian L. Johnson
*Assistant Examiner*—Matthew Luby
(74) *Attorney, Agent, or Firm*—McDermott, Will & Emery

(57) ABSTRACT

A vehicle occupant protecting apparatus at a time of lateral collision of an automobile is structured wherein, since a bottom face (13) of an airbag (8) contacts with an upper face (5) of an armrest (6), an upward reaction force F from the upper face (5) of the armrest (6) can act on the airbag (8) which has been pressed downward during development, whereby a developing speed of the airbag (8) can be improved.

8 Claims, 2 Drawing Sheets

APPARATUS FOR PROTECTING CREW MEMBER OF AUTOMOBILE WHEN COLLISION OF SIDE PORTION THEREOF OCCURS

TECHNICAL FIELD

The present invention relates to a vehicle occupant protecting apparatus at a time of lateral collision of an automobile.

BACKGROUND ART

As an airbag apparatus for an automobile, there is an airbag apparatus for lateral collision where an airbag is developed forward from a side portion of a backrest at a time of lateral collision of an automobile to protect a vehicle occupant (refer to Japanese Patent Application Laid-Open No. 9-136598 as a similar art).

In such an earlier technology, an airbag is developed forward while it is being expanded by gas injected from an inflator. Particularly in a case of an airbag apparatus for lateral collision, since a space between a vehicle occupant and a side wall of a vehicle body is narrow, the airbag is sometimes held between the occupant and the side wall during the development thereof, whereby the airbag is pressed downwardly. This is not preferable because, when the airbag is pressed downwardly, a developing speed of the airbag is reduced corresponding to a magnitude of the pressing force.

SUMMARY OF THE INVENTION

Therefore, it has been desired to propose a novel airbag apparatus capable of further increasing the developing speed of an airbag.

The present invention has been achieved to meet such a requirement, and it provides a vehicle occupant protecting apparatus at a time of lateral collision of an automobile which can increase a developing speed of an airbag.

A first aspect of the invention is a vehicle occupant protecting apparatus at a time of lateral collision of an automobile, comprising: an armrest formed on a vehicle body side wall adjacent to a backrest and having a generally horizontal upper face; an airbag disposed at a side portion of the backrest; and an inflator for injecting gas into the airbag at a time of collision to develop the airbag forward and above the armrest, wherein a bottom face of the airbag developed forward contacts with the upper face of the armrest.

According to the above structure, as the bottom face of the airbag which has been developed forward contacts with the upper face of the armrest, an upward reaction force can be applied from the upper face of the armrest to the airbag which has been pressed downward during development, thereby increasing a developing speed of the airbag.

In the configuration of the first aspect, a second aspect of the invention is structured such that the bottom face of the airbag which has been developed contacts with the upper face of the armrest in an overlapping manner.

According to the above structure, as not only the bottom face of the airbag which has been developed contacts merely with the upper face of the armrest but also the bottom face of the airbag contacts with the upper face of the armrest in an overlapping manner, a positive downward force is applied from the bottom face of the airbag on the upper face of the armrest. As a result, since an upward reaction force acting upon the airbag from the upper face of the armrest is further increased, the developing speed of the airbag is further improved. Particularly, an upward developing speed of the airbag is increased. Also, according to such a structure that the bottom face of the airbag contacts with the upper face of the armrest in the overlapping manner, even when a mounting error between the airbag and the armrest in a vertical direction or a variation of a vertical position of the backrest according to a reclining angle thereof occurs, such an error or variation can be absorbed.

In the configuration of the first aspect, a third aspect of the invention is structured such that the bottom face of the airbag which has been developed has a bent configuration which has been expanded downwardly.

According to the above structure, as the bottom face of the airbag which has been developed has the bent configuration which has been expanded downwardly, the contacting state between the bottom face of the airbag and the upper face of the armrest can be obtained without increasing the volume of the airbag so largely, as compared with a case that the bottom wall of the airbag is lowered while it is kept in a flat state. Since the volume of the airbag is not so increased, such a structure is effective for improving the developing speed of the airbag.

In the structure of the first aspect, a fourth aspect of the invention is structured such that the airbag has a generally L-shaped configuration and is partitioned into an upper head protecting portion and a lower chest protecting portion by a partitioning wall cloth with a vent hole provided inside the airbag, wherein the gas from the inflator is injected into the chest protecting portion.

According to the above configuration, as the chest protecting portion of the airbag is first developed forward by the gas injected by the inflator, the forward developing speed is improved.

In the structure of the fourth aspect, a fifth aspect of the invention is structured such that a gas injecting hole for injecting gas is formed on a bottom wall side of the chest protecting portion.

According to the above configuration, as the gas injecting hole is formed at a side face lower portion of the inflator, the gas is injected from the bottom face of the chest protecting portion along an inside face thereof, so that the development of the chest protecting portion is accelerated, thereby further increasing the developing speed of the chest protecting portion.

In the structure of the fifth aspect, a sixth aspect of the invention is structured such that the inflator is disposed along the backrest and the gas injecting hole is formed at a side face and lower end of the inflator.

According to the above configuration, as the gas injecting hole is formed at the side face lower end of the inflator, the gas is injected from the bottom face of the chest protecting portion along an inside face thereof, so that the development of the chest protecting portion is accelerated, thereby increasing further the developing speed of the chest protecting portion.

In the structure of the first aspect, a seventh aspect of the invention is structured such that the bottom face of the airbag contacting with the upper face of the armrest is subject to an upward reaction force from the upper face of the armrest.

According to the above configuration, as the upward reaction force acting from the upper face of the armrest on the airbag is further increased, even when the air bag is held between a vehicle occupant and a door to be pressed downwardly, the airbag can resist on a force acting so as to press the airbag downwardly, so that the airbag is developed forward. Since the airbag is prevented from being pressed downward, the airbag reaches a final developed state in a shorter time than that of a conventional airbag. That is, the developing speed of the airbag is improved.

An eighth aspect of the invention is a vehicle occupant protecting apparatus at a time of lateral collision of an automobile, comprising an armrest disposed on a vehicle body side wall adjacent to a backrest and having a generally horizontal upper face; an airbag disposed in a side portion of the backrest above the armrest and at a position facing the armrest; and an inflator injecting gas into the airbag at a time of collision to develop the airbag forward and above the armrest, wherein the airbag has a bottom face which expands towards the upper face of the armrest during development of the airbag to contact with the upper face of the armrest.

According to the above configuration, as it has such a structure that the bottom face of the airbag merely contact with the upper face of the armrest, even when the airbag is held between a vehicle occupant and a door to be pressed downwardly, an upward reaction force acts on the airbag which has been pressed downwardly.

BEST MODE FOR CARRYING OUT THE INVENTION

Figure 1:
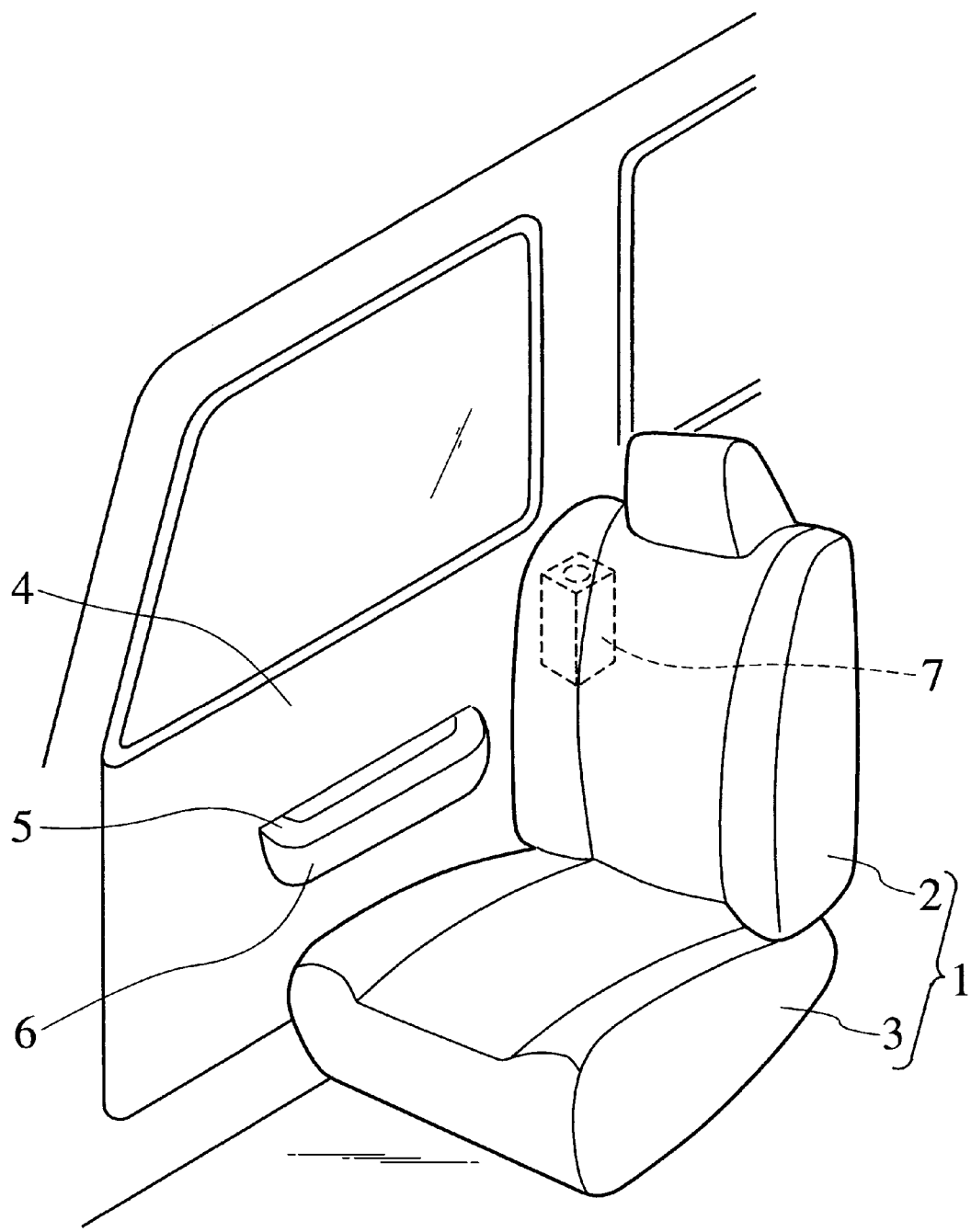
FIG. 1 is a perspective view of an inside of a vehicle occupant compartment showing a vehicle occupant protecting apparatus at a time of lateral collision of an automobile according to an embodiment of the present invention.
Figure 2:
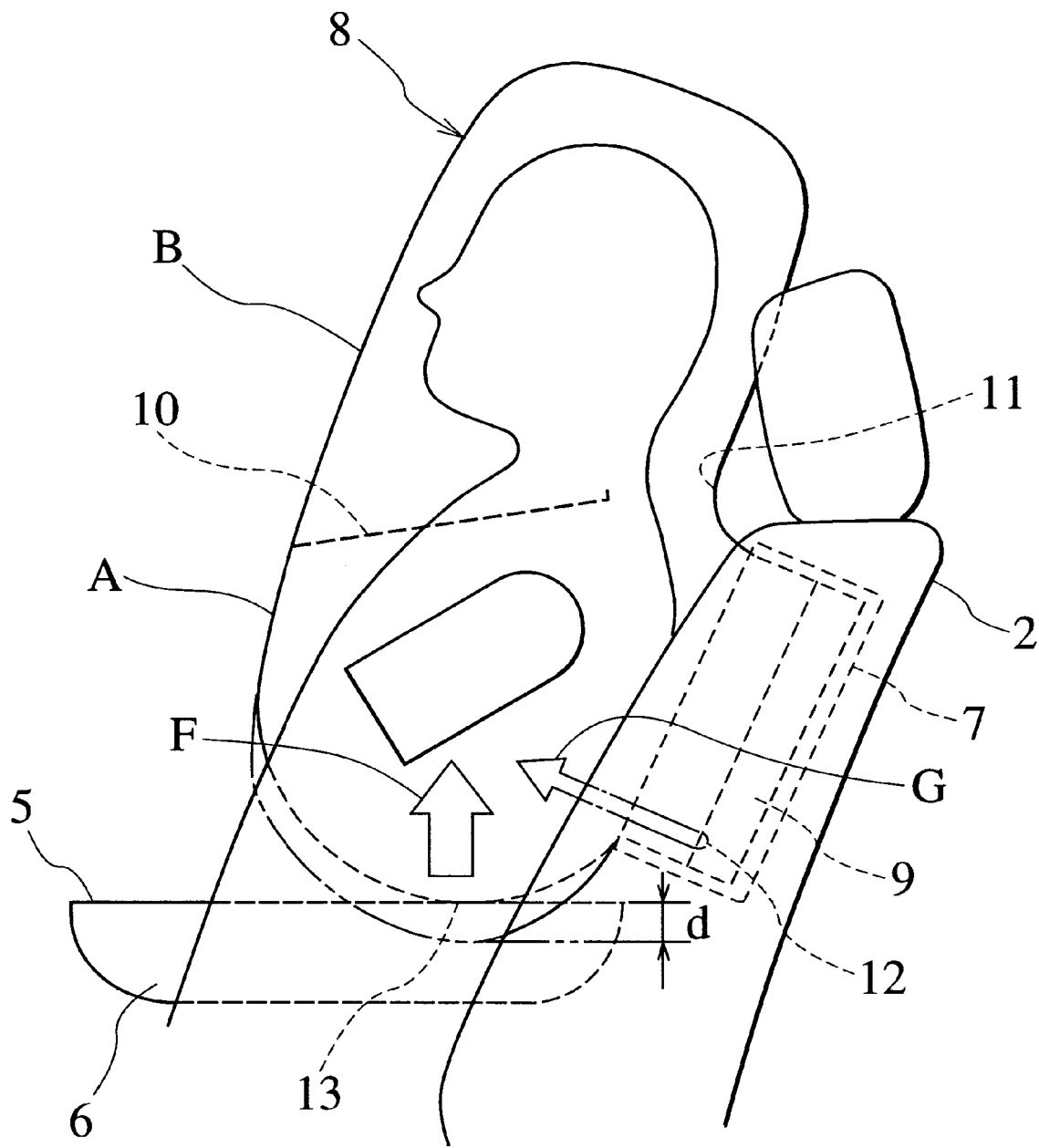
FIG. 2 is a side view showing a contacting state between an airbag and an armrest.

A preferred embodiment of the present invention will be described below with reference to FIGS. 1 and 2.

A reference numeral 1 denotes a right side front seat, which comprises a backrest 2 and a seat cushion 3. A door 4 which is as a 'vehicle body side wall' is positioned adjacent to the front seat 1, and an armrest 6 with a generally horizontal upper face 5 is provided on an inside face of the door 4.

An airbag module 7 is built in a right side end portion of the backrest 2. The airbag module 7 is positioned above the armrest 6 and is disposed on a side portion of the backrest 2 which opposes the armrest 6. An inflator and an airbag 8 disposed along the backrest 2 are accommodated in the airbag module 7. The airbag 8 is developed between a vehicle occupant and the door 4 to protect the vehicle occupant at a time of lateral collision of an automobile.

The airbag 8 has a generally L-shaped configuration, and is provided with a partitioning wall cloth 10 partitioning an inside space into a lower side chest protecting portion A and an upper side head protecting portion B. The partitioning wall cloth 10 is formed at its rear side with a vent hole 11.

The inflator 9 is formed at its side face lower end portion with an injecting hole 12. Gas G injected from the injecting hole 12 first enters into the chest protecting portion A to develop the chest protecting portion A forward, and then the gas G in the chest protecting portion A is introduced into the head protecting portion B via the vent hole 11 to develop the head protecting portion B upwardly.

A shape and a mounting position of the airbag 8 are set such that, when the airbag 8 is developed forward, a bottom face 13 thereof contacts with the upper face 5 of the armrest 6 by a predetermined vertical length d in an overlapping manner.

Next, a behavior of the airbag 8 during an actual development thereof will be explained. The airbag 8 developed forward and above the armrest 6 by gas G injected from the inflator 9 is expanded in a space between the vehicle occupant and the door 4. In the airbag 8, firstly, the chest protecting portion A is developed forward, and in the next, the head protecting portion B is developed upwardly.

The airbag 8 which has been developed forward is expanded toward the upper face 5 of the armrest 6, and, as mentioned above, the bottom face 13 of the airbag 8 contacts with the upper face 5 of the armrest 6 by the predetermined vertical length d in the overlapping manner. Thus, as the bottom face 13 of the airbag 8 contacts with the upper face 5 of the armrest 6 in the overlapping manner, a downward force positively acts on the upper face 5 of the armrest 6 from the bottom face 13 of the airbag 8.

As a result, depending upon the downward force, an upward reaction force F acting on the airbag 8 from the upper face 5 of the armrest 6 is further increased. Therefore, even when the airbag 8 is held or sandwiched between the vehicle occupant and the door 4 to be pressed, the airbag 8 can resist on the downward-pressing force, so that the airbag 8 is developed forward without being pressed down. Since the airbag 8 is not pressed and not lowered, the airbag 8 reaches to a final developed state in a shorter time than that a conventional airbag. That is, the developing speed of the airbag 8 is improved.

Also, as the bottom face 13 of the airbag 8 is caused to contact with the upper face 5 of the armrest 6 in the overlapping manner, even when there is a mounting error between the airbag 8 and the armrest 6 in a vertical direction or a variation of a vertical position of the airbag 8 due to a reclined angle of the backrest 2, the error or variation can be absorbed.

Furthermore, as the bottom face 13 of the airbag 8 is formed in a bent configuration bulging downward, the volume of the airbag 8 is not so increased, which is effective for improving the developing speed of the airbag 8. Also, since the airbag 8 is partitioned into the chest protecting portion A and the head protecting portion B by the partitioning wall cloth 10, and the chest protecting portion A with a small volume is developed by the gas G injected from the inflator 9, a forward-developing speed of the airbag 8 is improved. In addition thereto, as the injecting hole 12 for the gas G is formed at the side face lower end portion of the inflator 9, the gas G is injected from the bottom face of the chest protecting portion A along inside face thereof, so that the development of the chest protecting portion A is accelerated, whereby the developing speed can further be increased.

The embodiment has such a structure that the bottom face 13 of the airbag 8 contacts with the upper face 5 of the armrest 6 in the overlapping manner, but the present invention can be structured such that the bottom face 13 just contacts with (zero-touches to) the upper face 5 without overlapping. Even in a case where such a setting is effected so that the bottom face 13 just contacts with the upper face 5, for example, even if the airbag 8 is held between the vehicle occupant and the door 4 to be pressed downward, the upward reaction force F can act on the airbag 8 which has been pressed downward.

Also, though the airbag apparatus provided in the backrest 2 of the front seat has been explained as an example, the present invention is applicable to an airbag apparatus provided in a rear seat.

Industrial Applicability

As set forth above, according to the present invention, as the bottom face of the airbag which has been developed forward contacts with the upper face of the armrest, the upward reaction force from the upper face of the armrest can act on the airbag which has been pressed downward during development, so that the developing speed of the airbag can be improved. Also, the airbag is formed in the generally L-shaped configuration, the airbag is partitioned into the upper side head protecting portion and the lower side chest protecting portion by the partitioning wall cloth with the vent hole therein. Therefore the gas from the inflator is injected into the chest protecting portion side, the chest protecting portion is firstly developed forward by the gas injected from the inflator, so that the forward developing speed of the airbag can be further improved.

Accordingly, the present invention is useful as a vehicle occupant protecting apparatus at a time of lateral collision of an automobile.

What is claimed is:

1. A vehicle occupant protecting apparatus at a time of lateral collision of an automobile, comprising:

an armrest formed on a vehicle body side wall adjacent to a backrest, the armrest having a substantially horizontal upper face;

an airbag having a bottom face and being disposed at a side portion of the backrest; and an inflator that injects a gas into the airbag during the lateral collision to develop the airbag forward and above the armrest, wherein, during the lateral collision, the airbag is deployed such that if the armrest were not present, a portion of the bottom face of the airbag would be located below, by a predetermined distance, where the upper face of the armrest would normally be positioned, and wherein, because the armrest is present, an upward reaction force is created by the bottom face of the airbag acting on the upper face of the armrest during the lateral collision thereby decreasing the time for the airbag to completely develop.

2. A vehicle occupant protecting apparatus according to claim 1, wherein the bottom face of the airbag which has been developed has a bent configuration expanded downwardly.

3. A vehicle occupant protecting apparatus according to claim 1, wherein the airbag has a generally L-shaped configuration and is partitioned into an upper head protecting portion and a lower chest protecting portion by a partitioning wall cloth with a vent hole provided inside the airbag; and wherein the gas from the inflator is injected into the chest protecting portion.

4. A vehicle occupant protecting apparatus according to claim 3, wherein a gas injecting hole for injecting gas is formed on a bottom wall side of the chest protecting portion.

5. A vehicle occupant protecting apparatus according to claim 4, wherein the inflator is disposed along the backrest; and wherein the gas injecting hole is formed at a side face and lower end of the inflator.

6. A vehicle occupant protecting apparatus at a time of a lateral collision of an automobile, comprising:

an armrest disposed on a vehicle body side wall adjacent to a backrest, the armrest having a substantially horizontal upper face;

an airbag disposed in a side portion of the backrest above the armrest and at a position facing the armrest; and an inflator that injects a gas into the airbag during the lateral collision to develop the airbag forward and above the armrest, wherein the airbag has a bottom face which expands towards the upper face of the armrest during development of the airbag to contact the upper face of the armrest, wherein, during the lateral collision, the airbag is deployed such that, if the armrest were not present, a portion of the bottom face of the airbag would be located below, by a predetermined distance, where the upper face of the armrest would normally be positioned, and wherein, because the armrest is present, an upward reaction force is created by the bottom face of the airbag acting on the upper face of the armrest during the lateral collision, thereby decreasing the time for the airbag to completely develop.

7. An airbag apparatus for protecting a vehicle occupant during a side impact collision, the airbag being adapted to be housed in a backrest of a vehicle above an adjacent armrest, which is disposed on a vehicle body side wall and has a substantially horizontal upper face, the airbag apparatus comprising:

an upper side head protecting portion;

a lower side chest protecting portion connecting to a lower end of the upper side head protecting portion, the lower side chest protecting portion having a bottom face;

a partitioning wall disposed between the upper side head protecting portion and a lower side protecting portion, the partitioning wall including a vent that allows a gas to flow between the upper and lower portions;

an inflator disposed in the lower side protecting portion that injects the gas into the lower side protecting portion during a lateral collision, wherein the bottom face of the lower side chest protecting portion expands towards the upper face of the armrest during the side impact collision and contacts the upper face of the armrest, wherein, during the lateral collision, the airbag is deployed such that, if the armrest were not present, a portion of the bottom face of the airbag would be located below, by a predetermined distance, where the upper face of the armrest would normally be positioned, and wherein, because the armrest is present, an upward reaction force is created by the bottom face of the airbag acting on the upper face of the armrest during the lateral collision, thereby decreasing the time for the airbag to completely develop.

8. A vehicle occupant protecting apparatus at a time of lateral collision of an automobile, comprising:

an armrest formed on a vehicle body side wall adjacent to a backrest, the armrest having a substantially horizontal upper face;

an airbag having a bottom face and being disposed at a side portion of the backrest; and an inflator that injects a gas into the airbag during the lateral collision to develop the airbag forward and above the armrest, wherein, during the lateral collision, the airbag is deployed such that the airbag overlaps the armrest by a predetermined length, such that the airbag is prevented from expanding downward below the armrest by that predetermined distance by the action of the bottom face of the airbag acting on the upper face of the armrest, and wherein, due to the airbag overlapping the armrest by the predetermined length, an upward reaction force is created by the bottom face of the airbag acting on the upper face of the armrest during the lateral collision.

* * * * *